US008504285B2

(12) United States Patent
Vepsäläinen

(10) Patent No.: US 8,504,285 B2
(45) Date of Patent: Aug. 6, 2013

(54) METHOD AND APPARATUS OF ROUTE DETERMINATION

(75) Inventor: Ari M. Vepsäläinen, Espoo (FI)

(73) Assignee: Nokia Corporation, Espoo (FI)

( * ) Notice: Subject to any disclaimer, the term of this patent is extended or adjusted under 35 U.S.C. 154(b) by 551 days.

(21) Appl. No.: 12/467,090

(22) Filed: May 15, 2009

(65) Prior Publication Data

US 2010/0292914 A1    Nov. 18, 2010

(51) Int. Cl.
*G01C 21/00* (2006.01)
(52) U.S. Cl.
USPC .......................................................... 701/410
(58) Field of Classification Search
USPC ................................................ 701/200, 410
See application file for complete search history.

(56) References Cited

U.S. PATENT DOCUMENTS

| 5,400,254 | A |   | 3/1995  | Fujita |         |
|-----------|---|---|---------|--------|---------|
| 5,559,707 | A | * | 9/1996  | DeLorme et al. | 701/200 |
| 6,067,502 | A | * | 5/2000  | Hayashida et al. | 701/209 |
| 6,098,015 | A |   | 8/2000  | Nimura et al. | |
| 6,321,158 | B1 | * | 11/2001 | DeLorme et al. | 701/201 |
| 6,622,087 | B2 |   | 9/2003  | Anderson | |
| 7,089,110 | B2 | * | 8/2006  | Pechatnikov et al. | 701/210 |
| 7,386,392 | B1 | * | 6/2008  | Kabel et al. | 701/200 |
| 7,483,786 | B1 |   | 1/2009  | Sidoti et al. | |
| 2006/0241855 | A1 | | 10/2006 | Joe et al. | |
| 2007/0294028 | A1 | | 12/2007 | Gray et al. | |
| 2008/0027638 | A1 | | 1/2008  | Ando | |
| 2009/0125229 | A1 | | 5/2009  | Peri et al. | |

FOREIGN PATENT DOCUMENTS

JP    2004045053 A    2/2004
JP    2007017192 A    1/2007

OTHER PUBLICATIONS

"Study on Method of Route Choice Problem Based on User Preference"; Woo-Kyung Choi, Seong-Joo Kim, Tae-Gu Kang, Hong-Tae Jeon; vol. 4694/2009; On pp. 645-652; Publication date: Sep. 14, 2007; (http://www.springerlink.com/content/j82m362q26920508/).
"Learning User Preferences of Route Choice Behaviour for Adaptive Route Guidance"; Park, K., Bell, M., Kaparias, I., Bogenberger, K.; vol. 1; On pp. 159-166; Publication date: Jun. 2007; (http://ieeexplore.ieee.org/xpl/freeabs_all.jsp?arnumber=4211383).
"Drivers Route Selection: A Philosophical Consideration Anduser-Interface"; Pang, G., Takahashi, K., Yokota, T., Takenaga, H.; On pp. 147-154; Publication date: Jul. 30-Aug. 2, 1995; (http://ieeexplore.ieee.org/xplifreeabs_all.jsp?arnumber=518831).

* cited by examiner

*Primary Examiner* — Michael Fuelling
(74) *Attorney, Agent, or Firm* — Ditthavong Mori & Steiner, P.C.

(57) ABSTRACT

An approach is provided for off-road navigation. A starting point and a destination point to assist a user in navigating are received. A path from the starting point to the destination point using a vector function that represents cost of each area along the path is determined. The cost is based on direction from where the corresponding area is entered by the user.

20 Claims, 10 Drawing Sheets

US 8,504,285 B2

METHOD AND APPARATUS OF ROUTE DETERMINATION

BACKGROUND

Wireless (e.g., cellular) service providers and device manufacturers are continually challenged to deliver value and convenience to consumers by, for example, providing compelling network services, applications, and content, as well as user-friendly devices. Important differentiators in this industry are application and network services. In particular, these services can include navigation service applications for guiding users through various routes. Traditionally, little effort has been directed to determining routes that consider factors other than distance and fixed roads.

SOME EXAMPLE EMBODIMENTS

According to one embodiment, a method comprises receiving a starting point and a destination point to assist a user in navigating; and determining a path from the starting point to the destination point using a vector function that represents cost of each area along the path, wherein the cost is based on direction from where the corresponding area is entered by the user.

According to another embodiment, a computer-readable medium carries one or more sequences of one or more instructions which, when executed by one or more processors, cause an apparatus to perform at least the following: receiving a starting point and a destination point to assist a user in navigating; and determining a path from the starting point to the destination point using a vector function that represents cost of each area along the path, wherein the cost is based on direction from where the corresponding area is entered by the user.

According to yet another embodiment, an apparatus comprises at least one processor, and at least one memory including computer program code. The at least one memory and the computer program code configured to, with the at least one processor, cause the apparatus to perform at least the following: receive a starting point and a destination point to assist a user in navigating; and determine a path from the starting point to the destination point using a vector function that represents cost of each area along the path, wherein the cost is based on direction from where the corresponding area is entered by the user.

According to yet another embodiment, an apparatus comprises means for receiving a starting point and a destination point to assist a user in navigating; and means for determining a path from the starting point to the destination point using a vector function that represents cost of each area along the path, wherein the cost is based on direction from where the corresponding area is entered by the user.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF PREFERRED EMBODIMENTS

A method, apparatus, and software are provided for navigation support. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to navigation application that address off-road or free terrain scenarios, it is contemplated that the approach described herein may be used with on-road situations.

Figure 1:
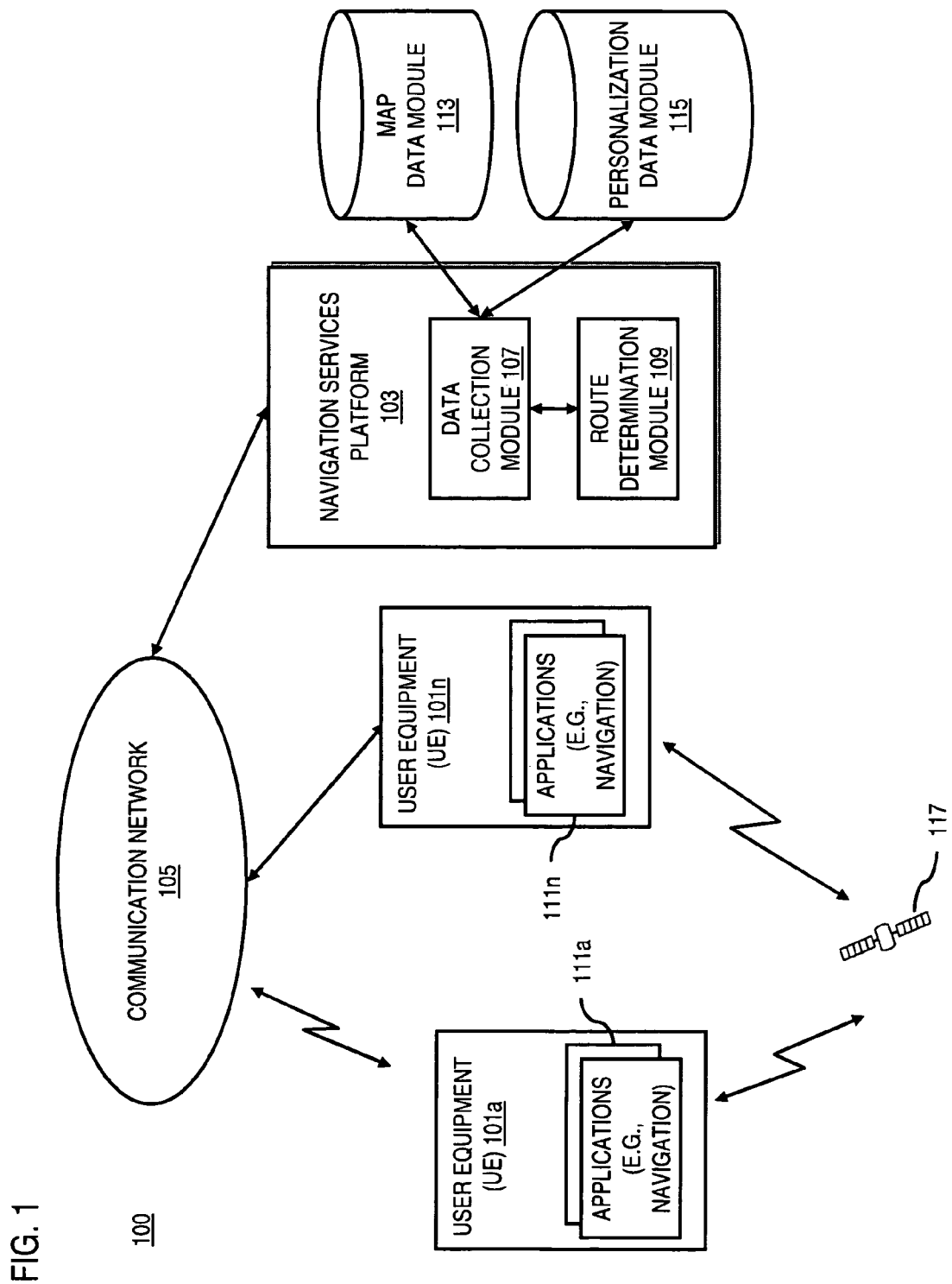
FIG. 1 is a diagram of a system capable of providing navigation support to a user, according to one embodiment.

FIG. 1 is a diagram of a system capable of providing navigation support to a user, according to one embodiment. For the purposes of illustration, system 100 provides for the management of navigation services on user equipment. As shown in FIG. 1, system 100 comprises one or more user equipment (UEs), e.g., UEs 101a-101n, having connectivity to a navigation services platform 103 via a communication network 105. The navigation services platform 103 can provide dynamic route calculations, map visualizations, and turn-by-turn navigation services to a UE 101 through the use of a data collection module 107 and a route determination module 109.

The data collection module 107 can receive user information from various sources. In one embodiment the data collection module 107 receives user information from a UE 101 running a navigation application 111a-111n. The information can include, for example, user capabilities, user skills, user experience, user resources, user location, user destination, and other relevant user data. Additionally, the data collection module 107 can receive data from a map data module 113. The map data module 113 can access data from various databases including Geographic Information Systems (GIS), governmental map databases, electronic navigable map databases, geographic weather databases, user specific map databases, and satellite and other images. These databases can provide terrain, weather, obstacle, and other useful information for determining off-road routing. Maps can include roads, footpaths, tracks, buildings, tunnels, terrain types (e.g. trees, rocks, bushes, swamps, snow, ice, etc.), restricted areas, altitudes, or the like. The maps can be in a bitmap or vector format. Maps used may be pre-processed in the same projections, i.e., a Mercator projection or an equirectangular projection, so the maps can be processed more quickly. Different projections are more optimal than others used in different geographical regions. Additionally, the data collection module 107 can receive data from a personalization data module 115. A personalization data module 115 obtains and can retain information regarding a user or a group of users. The personalization data module 115 may be updated by the user via a user application, automatically by an application, by a third party, or the like.

The route determination module 109 processes data collected by the data collection module 107 to determine a route from a start point to a destination point. The route can be customized to a user or a group of users at with certain capabilities and equipment to determine the optimal routes from the start point to the destination point. For example, if it is raining and a user is on foot without an umbrella, the module 107 can select routes between the start point and the destination point that utilize tunnels or other rain-shielding structures. Additionally, the route determination module 109 can optimize routes close to points of interest (POIs) by adding the POI to the determined path.

The navigation application 111 on the UE 101 can be utilized to by a user to interface with the navigation services platform 103. In some embodiments, user information, such as user capabilities, user skills, user experience (e.g. beginner, intermediate, expert, etc.), and user resources (e.g. bicycles, climbing equipment, canoe, etc.), are input by the user on the UE 101. In further embodiments location information is obtained from geographic technology, such as the Global Positioning System (GPS), assisted GPS (A-GPS) systems, Cell of Origin systems, triangulation systems, and other locator systems, by the UE 101 transparent or nontransparent to the user. For example, a GPS enabled UE 101 may determine the location of a UE 101 using GPS satellites 117 with or without a user's knowledge. A GPS-enabled receiver can detect its location, including altitude using four satellites. In some embodiments, the user can select the difficulty, such as easy, moderate, challenging, or hazardous, of the route.

The UEs 101a-101n are any type of mobile terminal, fixed terminal, or portable terminal including mobile handsets, mobile phones, mobile communication devices, stations, units, devices, multimedia tablets, digital book readers, game devices, audio/video players, digital cameras/camcorders, positioning device, televisions, radio broadcasting receivers, Internet nodes, communicators, desktop computers, laptop computers, Personal Digital Assistants (PDAs), or any combination thereof. Under this scenario, the UE 101a employs a radio link to access network 105, while connectivity of UE 101n to the network 105 can be provided over a wired link. It is also contemplated that the UEs 101a-101n can support any type of interface to the user (such as "wearable" circuitry, etc.).

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), the Internet, or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, mobile ad-hoc network (MANET), and the like. In addition, the wireless network may be, for example, a short range network, such a Bluetooth® network, ultra wide band (UWB) network, radio frequency identification (RFID) network or infrared network (IrDA).

Furthermore, the UEs 101a-101n can communicate with the navigation services platform 103 over the communication network 105 using standard protocols. The UEs 101a-101n and the platform 103 are network nodes with respect to the communication network 105. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are effected, for example, by exchanging discrete packets of data. Each packet comprises, for example, (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol indicates, for example, a type for the next protocol contained in its payload. The higher layer protocol is said to be encapsulated in the lower layer protocol. The headers included in a packet traversing multiple heterogeneous networks, such as the Internet, include, for example, a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
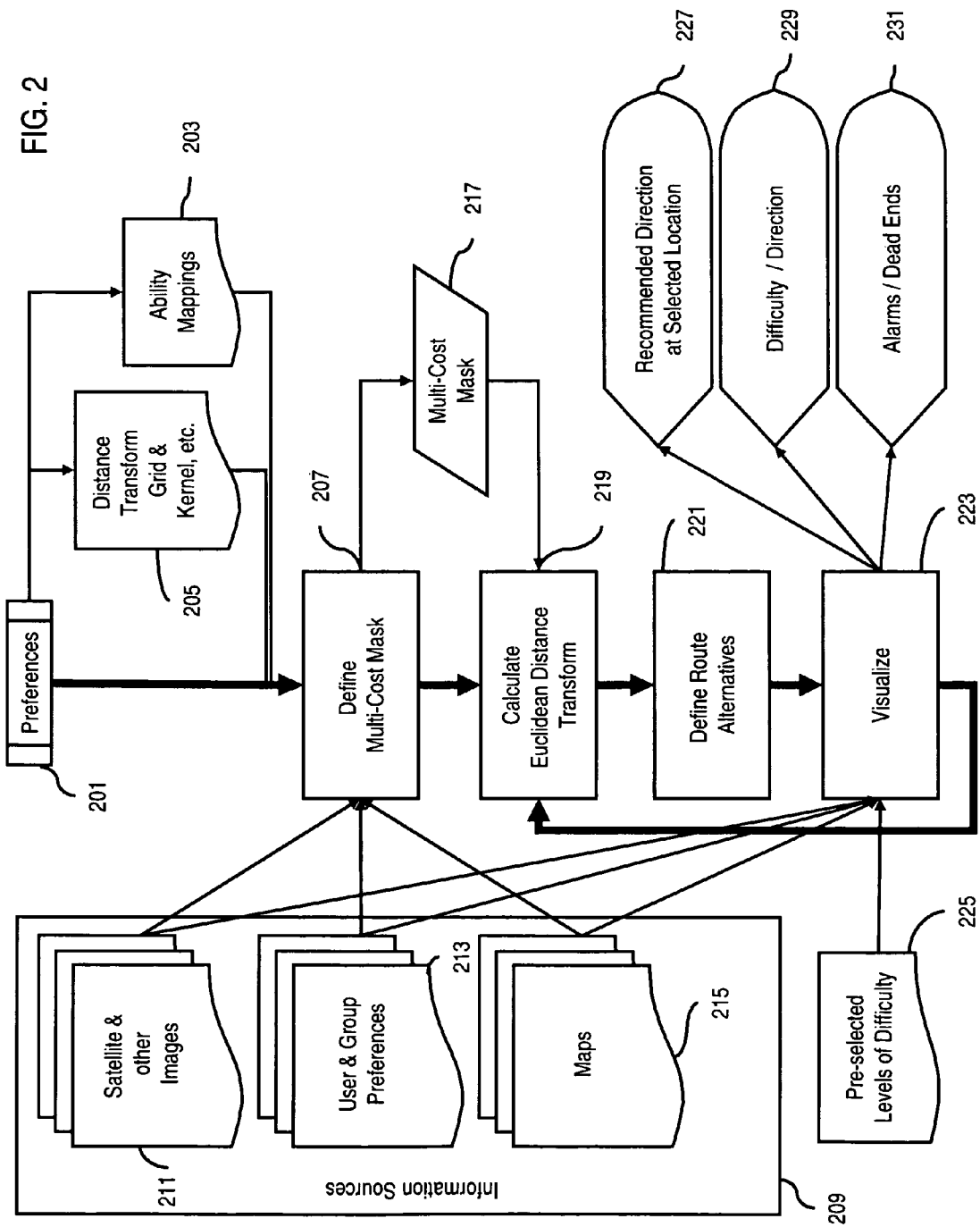
FIG. 2 is a flowchart of a process for providing off-road routing support to a user, according to one embodiment.

FIG. 2 is a flowchart of a process for providing off-road routing support to a user, according to one embodiment. The process, in certain embodiments, uses a heuristic function as cost in a distance transform between a starting point and a destination point. A user can begin by entering or selecting previously stored user information such as user capabilities, user skills, user experience, user resources, and other relevant user data. The user then sets preference parameters 201 regarding the type of route the user requests, degrees or difficulty of traverse requested, as well as enter the destination point in a UE 101 navigation application 111. The navigation application 111 then converts a portion of the preferences and user information into ability mappings 203 for the user and a base for a structuring element such as a distance transform kernel or grid 205. A kernel is a shape (e.g., a 3×3 square or a 5×5 square) used to probe or interact with an image for the purpose of drawing conclusions about the shape fits within the image. Certain kernels can be used in mathematical morphology to determine distances in a distance transform. Examples of kernels include the City-block, Chessboard, and Chamber-5-7-11 kernels.

At step 207, a multi-cost mask 217 is defined using the preferences, ability mappings, and information sources 209. The multi-cost mask 217 defines a transition cost or an index to the cost for each kernel point (i.e. a cost from any point to all other points defined by the kernel). Information sources 209 for the multi-cost mask 217 can include satellite images 211, user and group preferences 213 from a database, maps 215, and other data captured by the data collection module 107. A map, image, or other representation of the areas between the start point and the destination point can start the basis for a multi-cost mask 217. The multi-cost mask 217 can define costs attached to each pixel or area. The cost function can be approximated based on satellite images, differences in altitude, user input, government databases, GIS databases, etc. The function can include parameters for terrain, environmental condition, hazardous conditions, temperature (current and predicted), wind speed and direction (current and predicted), user fitness level, user off-road navigation experience level, etc. The multi-cost mask 217 can be a vector field; therefore the costs may have a direction, for instance traveling up a hill may have a positive cost while traveling down a hill may have a negative cost. Thus, from what direction a user enters a pixel or area changes the cost of a path. Additionally, the cost defined may be different based on user's garments, equipment, mode of travel, and/or abilities. For instance, an additional cost may be added for a biker traveling uphill while traversing a path. The multi-cost mask 217 may be defined using all or a selection of the available information sources 209.

Once the multi-cost mask 217 is determined, the mask can be used to calculate a cost-based distance. At step 219, the multi-cost mask 217 is used to calculate a distance transform. In one embodiment an Approximated Euclidean Distance Transform (AEDT) for a vector field is used. A Euclidean Distance Transform (EDT) is a representation of the distance between two points in a Cartesian space. The AEDT uses a function searches for an optimal route by finding the distance to the estimated path. Thus, search visit edges that are close to the estimated path are used. Search efficiency is improved in case the optimal route is close to the estimated path. Additionally, the AEDT determines an optimized route using a heuristic function h(x) as cost and setting an additional penalty depending on the distance from the approximated route or path. The heuristic function can be a distance-plus-cost algorithm that is the sum of two functions, the path-cost function and an admissible heuristic estimate of the distance to the goal. The goal can be an estimated route. The AEDT is an iterative EDT that operates on a vector field multi-cost mask. Thus, the distance calculated for a route optimization depends on direction, not only the position of the point that the calculation is based upon.

The AEDT algorithm computes approximations of the EDT in iterations. During each iteration, the pixels of the multi-cost mask are processed to determine the pixel's distance from the start point. The distance, where h(x)=P(r) and is a function of the edge distance from the estimated path. According to this embodiment, r represents the distance of the center of the edge to the estimated path. The heuristic function can also be represented by P(d, r) where d is the density of vertexes close to the estimated path. According to this embodiment, d is the estimated density of the vertexes (e.g. the inverse of the median distance of a vertex or its neighboring vertexes). During an iteration, the distance from border edges of a pixel to non-object edges are calculated. Each iteration improves the estimated path results using the EDT. Convex regions are used in second iterations as points in the kernel. Accordingly, the logic to define when to iterate is different. Thus, an exact EDT is not defined for the entire image, but can be limited to areas where the vector field suppresses to a scalar field within convex regions.

In step 221, route alternatives are defined. The optimal routes follow the minima of the distance transform. Multiple routes can be candidates that fulfill the conditions of a user. Additionally, route calculations can be repeated in order to take additional requirements into account. These requirements can also be weighted based on the user's preferences. At step 223, a user can be presented with the results of the identified routes. Also, a user can be presented with the option to look at each route based on user preferences. The user can set a selected level of difficulty 225 or a requested cost in the user's preferences. The user is thus presented with the preferred or best route alternatives from the start point to the destination point. The user can also be presented with the costs associated with each route point and the overall cost. Pixels (or areas) on the route can be color coded, display assigned numerical cost value, or display an arrow to show the pixel's cost based on entry point. Because a pixel's cost can change based on entry location, the user can view a recommended direction 227 to enter a pixel at a selected location. Further, a user can be presented a view of difficulty based on direction from a selected path or location 229. Additionally, the user can be warned of dead ends 231, dangerous areas, and other points of interest.

Figure 3:
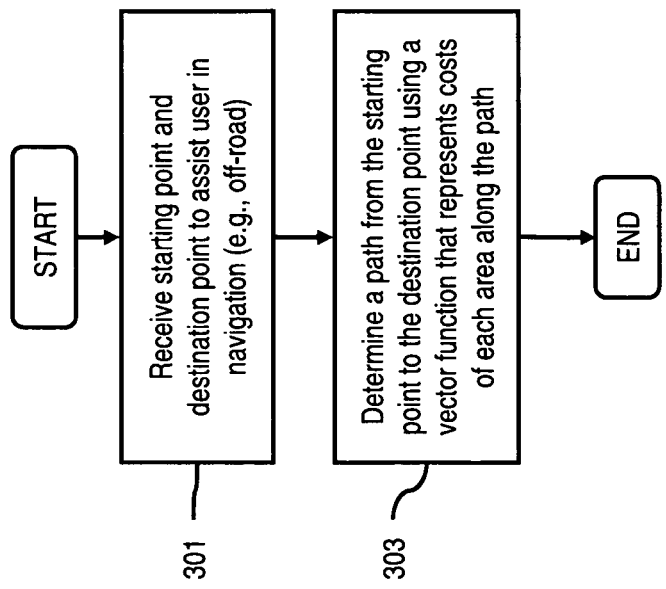
FIG. 3 is a flowchart of a process for providing off-road navigation support to a user, according to one embodiment.

FIG. 3 is a flowchart of a process for providing off-road navigation support to a user, according to one embodiment. At step 301, a navigation application 111 on a UE 101 or navigation services platform 103 receives a starting point and a destination point to assist a user in off-road navigation. The starting point can be determined using a location system on the UE 101 such as GPS, A-GPS, or other triangulation means. Alternatively, both the starting point and destination point can be set by the user. Once the starting and destination points are defined, step 303 determines a path from the starting point to the destination point using a vector function that represents costs of each area along the path. Each area along the path may be represented by a pixel or multiple pixels and can have a direction associated with the cost. Thus, the cost of an area along the path can be based on direction from where the corresponding area is entered by the user.

With the above approach, users can advantageously customize off-road navigation based on directional as well as scalar information. In this manner, activities performed by the user while traversing the path, such as rock climbing, can be used to customize the path. For example, this approach will allow a user to select a route that includes descending from a cliff rather than climbing it.

Figure 4:
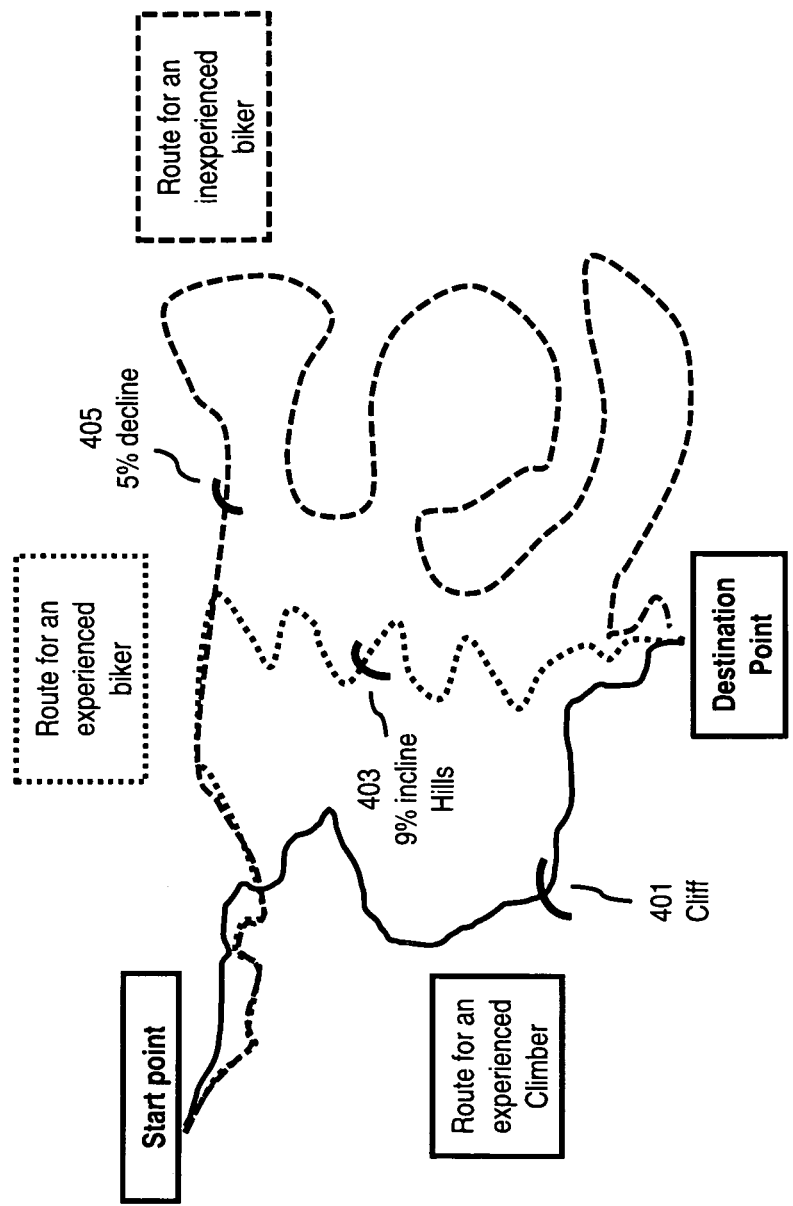
FIG. 4 is a diagram of a navigation visualization of an off-road navigation support application, according to one embodiment.

FIG. 4 is a diagram of a navigation visualization of an off-road navigation support application, according to one embodiment. The solid line represents a route for an experienced climber. The user's path can be optimized for the user's experience, climbing gear, and equipment. The user can input a preference to optimize the route to include a certain level of difficulty. The route optimization can thus plan a path including the scaling of a cliff 401 for the path. Because the route can have direction, the optimal path from the destination point to the start point may be different because the descending a cliff may have a cost in a path. The dotted line represents a route calculated for an experienced biker with a mountain bike. This route can have an average incline of 9% and be in a hilly 403, unpaved area. The route can include paths and rocky terrain to optimize an experienced biker with a mountain bike's route. The dashed line represents a route for an inexperienced biker with a speed bike. This route can be optimized to have an average 5% decline along a paved or dirt path. A user at the starting point may have these alternatives available to the user to arrive at the destination point.

Figure 5:
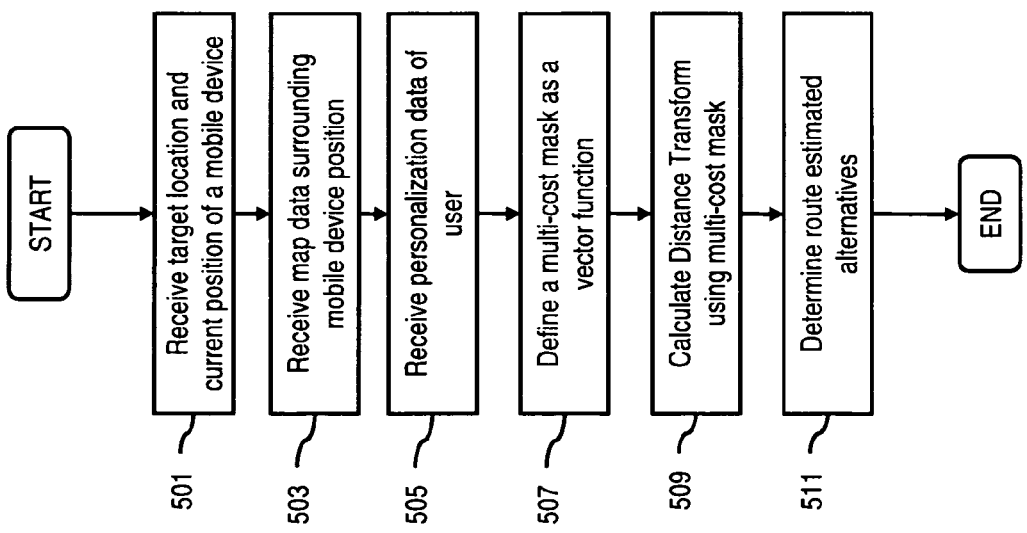
FIG. 5 is a flowchart of a process for customized off-road navigation of a user, according to one embodiment.

FIG. 5 is a flowchart of a process for customized off-road navigation of a user, according to one embodiment. A user can input a target location in a mobile device (e.g., UE 101). The mobile device 101 can determine its current position using known technologies. The mobile device 101 then sends and a navigation services platform 103 at step 501 receives the target location and current position of the mobile device 101. At step 503, the navigation services platform 103 receives map data surrounding the area from the mobile device's position to the destination point or target location. The map data can include geographic information, points of interest, weather information, and the like. Then, at step 505 the navigation services platform 103 receives personalization data of the user stored in a database or sent from the mobile device. The personalization data can include the user's attributes, experience, equipment, and the like. The navigation services platform 103 then defines a multi-cost mask as a vector function based on the information available about the user and location. At step 509, a distance transform of the multi-cost mask is calculated providing estimated paths based on the cost information. Then, at step 511, alternative routes are determined and can be displayed to a user.

With the above approach, the user can permit factors such as available equipment and garment to impact route selection. Thus, equipment available, such as bikes and climbing gear, and activities performed by the user while traversing the path, such as rock climbing and bike riding, can be used to customize the path. For example, this approach will allow a user to select an optimal route that includes mountain biking customized to the user's level of difficulty at will.

Figure 6:
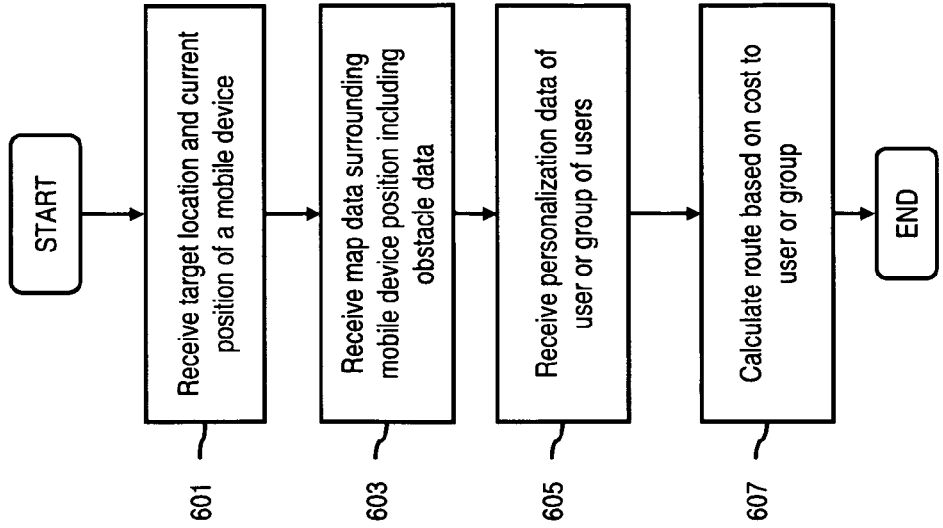
FIG. 6 is a flowchart of a process for off-road navigation of a group of users, according to one embodiment.

FIG. 6 is a flowchart of a process for off-road navigation of a group of users, according to one embodiment. A user can begin a navigation application 111 and select a target location in a mobile device. The mobile device 101 then determines its current position using known technologies such as GPS or other triangulation methods. The mobile device 101 then sends and a navigation services platform 103 at step 601 receives the target location and current position of the mobile device 101. At step 603, the navigation services platform 103 receives map data of the surrounding area from the position of mobile device 101 to the destination point. The map data can include obstacle data, geographic information, points of interest, weather information, and the like. Then, at step 605 the navigation services platform 103 receives personalization data of the user or a group of users stored in a database or sent from the mobile device 101. The personalization data can include the user or group's attributes, experience, equipment, and the like. At step 607, the navigation services platform 103 calculates estimated routes to the destination point. The navigation services platform 103 can define a multi-cost mask as a function based on the information available about the users and location. In some embodiments, the mask is determined based on the weakest user in the group, individualized for selections of members of the group, or a predefined set of rules. For example, the predefined set of rules could require that a capability of at least one of the members of group is tying a butterfly knot. Alternative or optimal routes can then be displayed to a user.

With the above approach, customization of off-road navigation can be provided to a group of users. In this manner, the abilities of a group of people can be used to customize a route. For example, this approach will allow a user to select an optimal route that includes a group of people working together to traverse a path.

Figure 7:
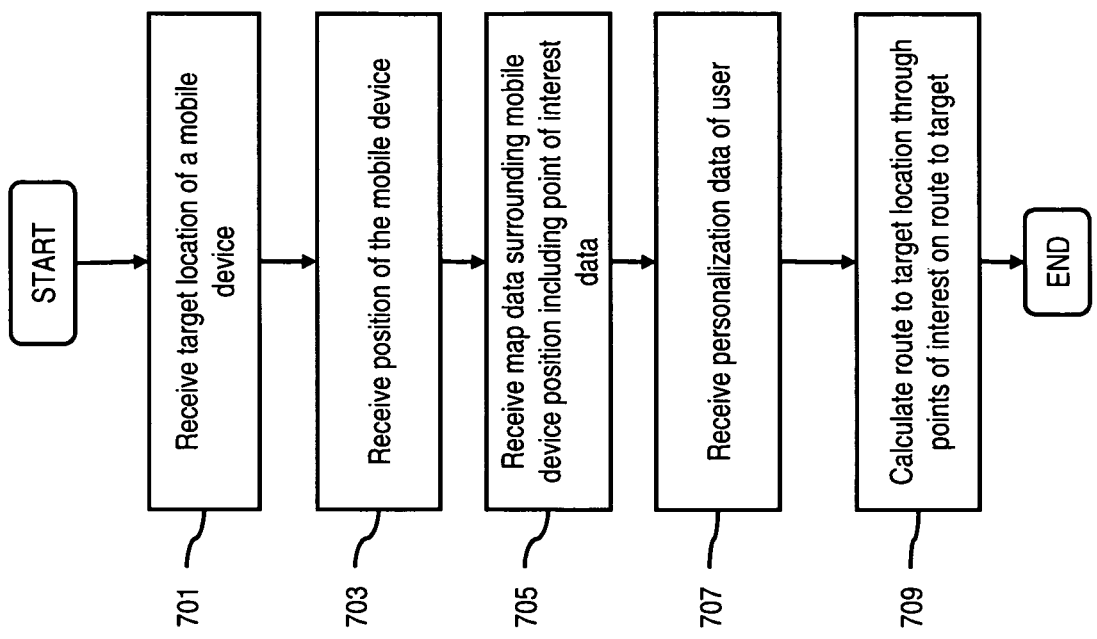
FIG. 7 is a flowchart of a process for off-road navigation via points of interest, according to one embodiment.

FIG. 7 is a flowchart of a process for off-road navigation via points of interest, according to one embodiment. A user can begin a navigation application 111 and select a target location or destination point in a mobile device 101. The mobile device 101 then determines its current position using known technologies such as GPS or other triangulation methods. The mobile device 101 then sends and a navigation services platform 103 at step 701 receives the target location of the mobile device 101. At step 703, the navigation services platform receives the current position of the mobile device 101. Further, at step 705, the navigation services platform 103 receives map data surrounding the area from the mobile device's position to the destination point. The map data can include obstacle data, geographic information, points of interest, weather information, and the like. Next, at step 707 the navigation services platform 103 receives personalization data of the user stored in a database or sent from the mobile device 101. The personalization data can include the user's attributes, experience, equipment, and the like. At step 709, the navigation services platform 103 calculates estimated routes to the destination point, including routes through points of interest on estimated routes to the target location or destination point. Alternative routes can then be displayed to a user and the user may choose to delete a point of interest from the itinerary, causing the navigation application to recalculate the current route.

Figure 8:
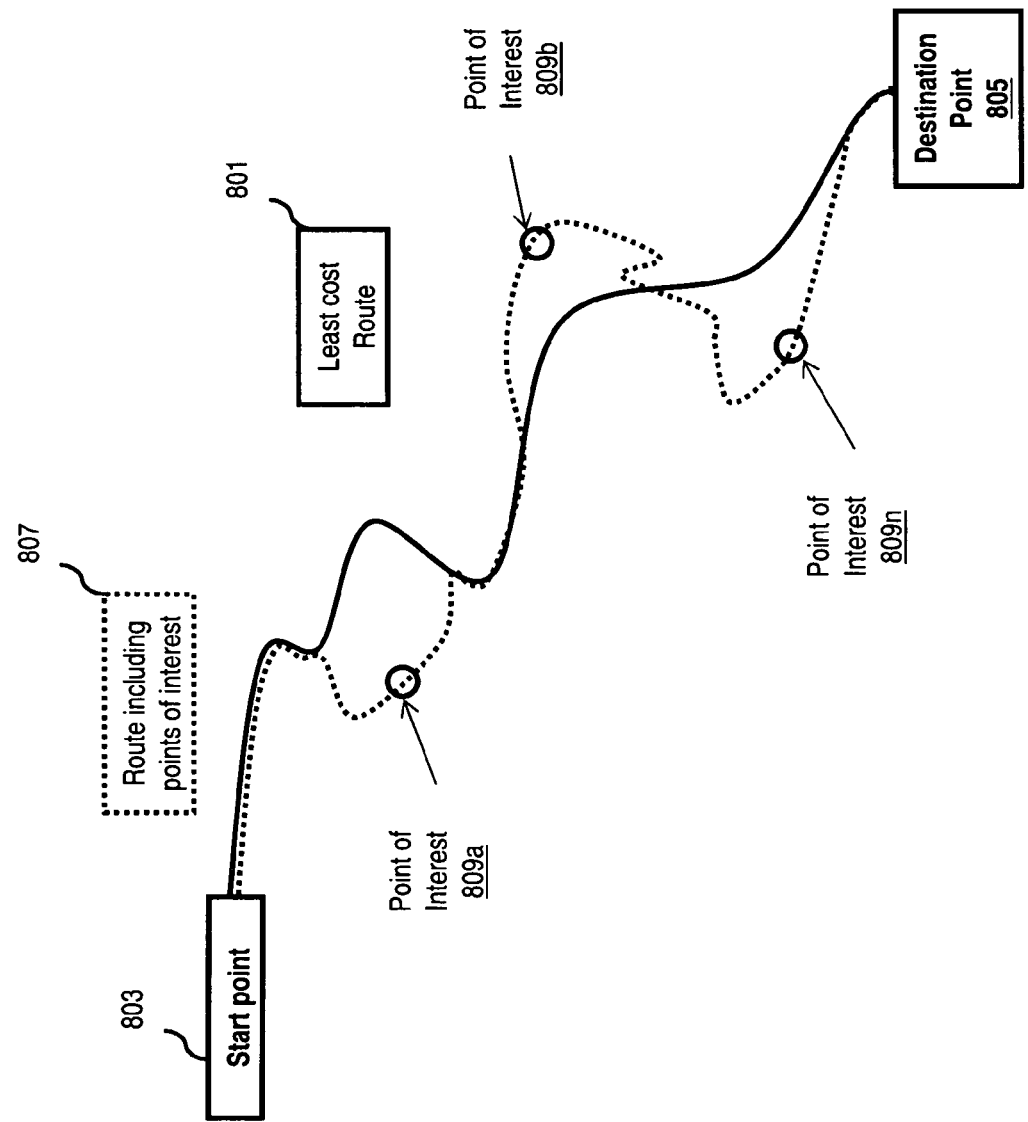
FIG. 8 is a diagram of a navigation visualization of an off-road navigation support application routing through points of interest, according to one embodiment.

FIG. 8 is a diagram of a navigation visualization of an off-road navigation support application routing through POIs, according to one embodiment. The solid line represents the least cost route 801 from the start point 803 to the destination point 805 as calculated by a navigation application. After this route is calculated, the navigation application locates POIs along the path. The deviance from the path or cost associated with the deviance can be entered as a parameter by the user. The dotted line represents a route 807, including POIs 809*a*-809*n*, that are nearby the selected or least cost route 801 route. These POIs can break up traveling from the start point 803 to the destination point 805.

Given the described process, a user can select a route, close to an optimal route, that can provide the user with the ability to rest at desired POIs while traversing a path.

The processes described herein for providing navigational services be implemented via software, hardware, e.g., general processor, Digital Signal Processing (DSP) chip, an Application Specific Integrated Circuit (ASIC), Field Programmable Gate Arrays (FPGAs), etc., firmware or a combination thereof. Such exemplary hardware for performing the described functions is detailed below.

Figure 9:
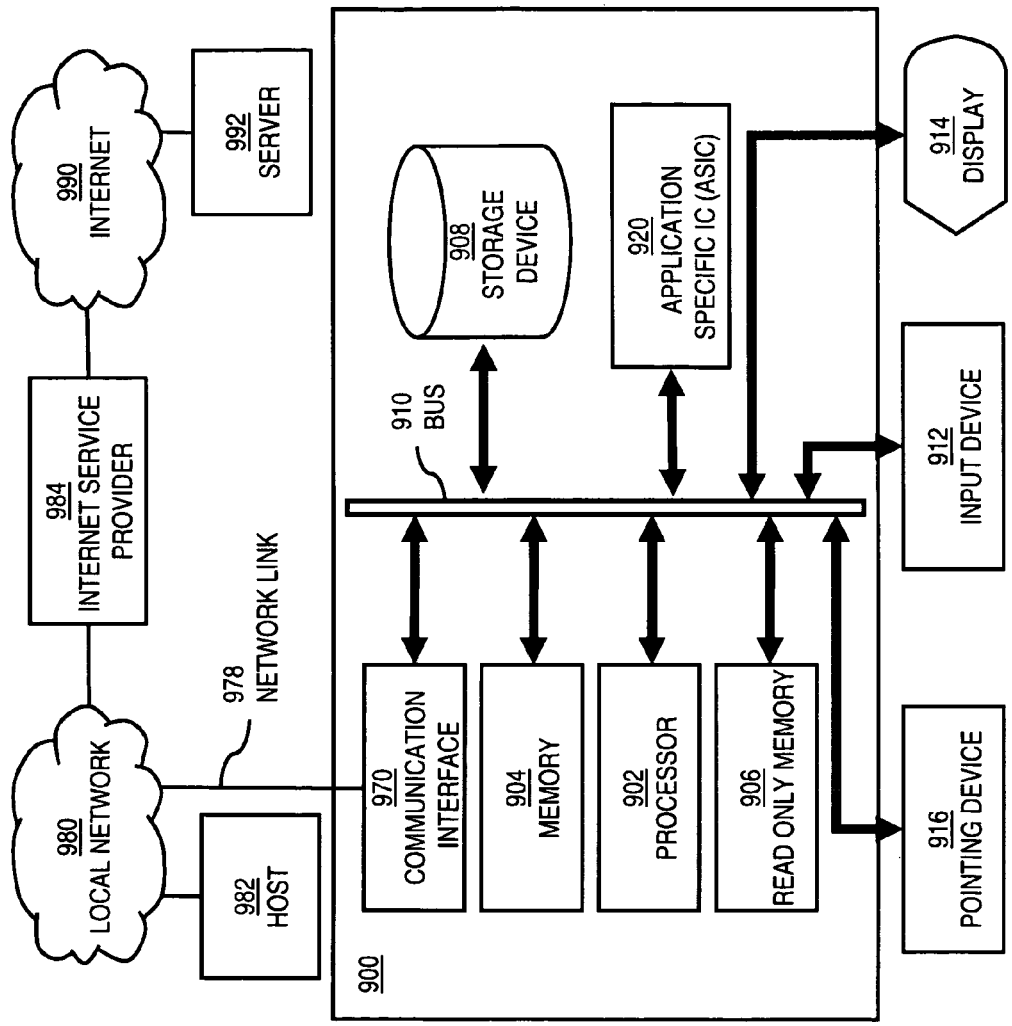
FIG. 9 is a diagram of hardware that can be used to implement an embodiment of the invention.

FIG. 9 illustrates a computer system 900 upon which an embodiment of the invention may be implemented. Computer system 900 is programmed (e.g. via computer program code or instructions) to provide applications, e.g. navigation as described herein and includes a communication mechanism such as a bus 910 for passing information between other internal and external components of the computer system 900. Information (also called data) is represented as a physical expression of a measurable phenomenon, for example electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 910 includes one or more parallel conductors of information so that information is transferred quickly among devices coupled to the bus 910. One or more processors 902 for processing information are coupled with the bus 910.

A processor 902 performs a set of operations on information related to navigation as well as route optimization. The computer program code is a set of instructions or statements providing instructions for the operation of the processor and/ or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also include, for example, comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for navigation. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for navigation, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 105 for sending and receiving navigation data.

The term computer-readable medium is used herein to refer to any medium that participates in providing information to processor 902, including instructions for execution. Such a medium may take many forms, including, but not limited to, non-volatile media, volatile media and transmission media.

Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Figure 10:
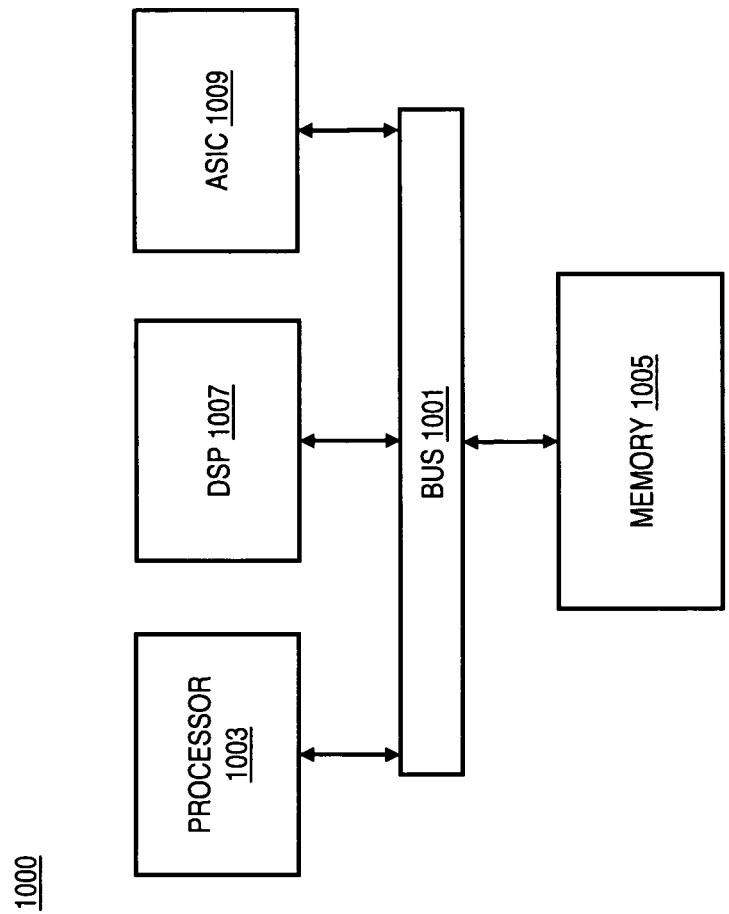
FIG. 10 is a diagram of a chip set that can be used to implement an embodiment of the invention.

FIG. 10 illustrates a chip set 1000 upon which an embodiment of the invention may be implemented. Chip set 1000 is programmed to provide navigational assistance as described herein and includes, for instance, the processor and memory components described with respect to FIG. 10 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to provide navigational assistance to a user. The memory 1005 also stores the data associated with or generated by the execution of the inventive steps.

Figure 11:
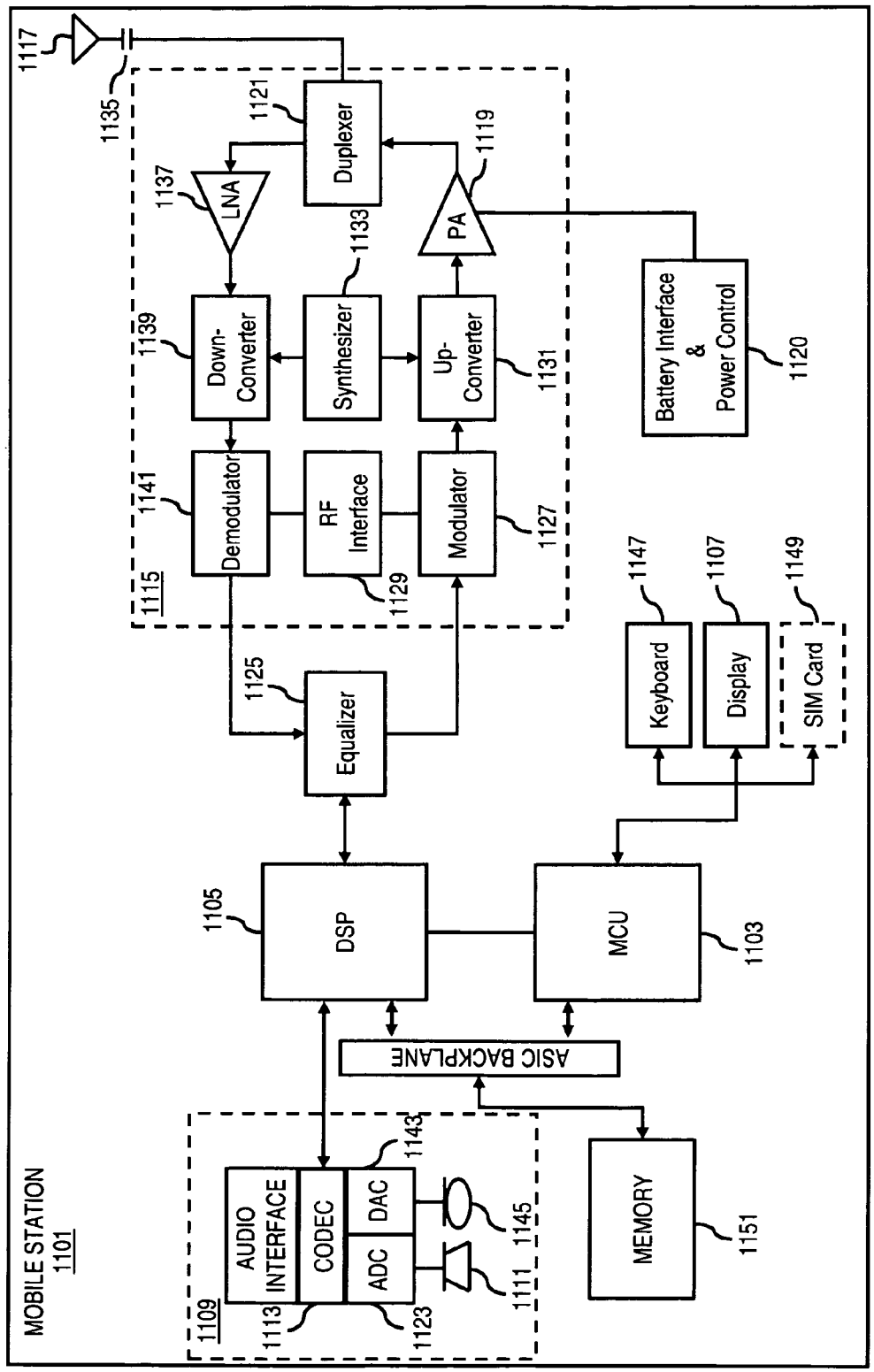
FIG. 11 is a diagram of a mobile station (e.g., handset) that can be used to implement an embodiment of the invention.

FIG. 11 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile station functions, such as navigation. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile station 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile station 1101 according to, for example, an multi-touch user interface. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the station. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile station 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves to identify the mobile station 1101 on a radio network. The card 1149 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    receiving a starting point and a destination point to assist a user in navigating; and
    determining with one or more processors a path from the starting point to the destination point using a vector function that represents a cost of each area along the path, wherein the cost of each area along the path is based on direction from where the corresponding area is entered by the user,
    wherein the vector function that represents a cost of each area along the path includes parameters for at least terrain, current temperature, predicted temperature, current wind speed and direction, and predicted wind speed and direction.

2. A method of claim 1, wherein the vector function further includes at least a user preference parameter that accounts for ease of traversing the path by the user.

3. A method of claim 2, further comprising:
    initiating presentation of a menu of options relating to degrees of difficulty of traversing the path.

4. A method of claim 2, wherein another user preference parameter specifies either mode of transportation of the user along the path, garment or equipment available to the user, fitness level of the user, experience level in navigating, or a combination thereof.

5. A method of claim 4, wherein the user is a part of a group of users, the method further comprising:
    determining a group preference parameter to be computed by the vector function.

6. A method of claim 1, wherein the vector function further includes a parameter relating to hazardous condition.

7. A method of claim 1, wherein the vector function further includes a parameter specifying a penalty in terms of cost depending on distance away from the path.

8. A method of claim 1, further comprising:
    retrieving an image including the starting point and the destination point,
    wherein each area corresponds to one or more pixels of the image.

9. A method of claim 1,
    wherein the parameters are used in a multi-cost mask to define the costs of each area along the path, the method further comprising:
    calculating a distance transform of the multi-cost mask to provide estimated paths between the starting point and the destination point based on the cost; and
    determining an optimized path using an Approximated Euclidean Distance Transform that uses a heuristic function h(x) as cost and that sets a penalty depending on distance from an approximated path.

10. An apparatus comprising:
    at least one processor; and
    at least one memory including computer program code, the at least one memory and the computer program code configured to, with the at least one processor, cause the apparatus to perform at least the following, receive a starting point and a destination point to assist a user in navigating, and determine a path from the starting point to the destination point using a vector function that represents a cost of each area along the path, wherein the cost of each area along the path is based on direction from where the corresponding area is entered by the user,
    wherein the vector function that represents a cost of each area along the path includes parameters for at least terrain, current temperature, predicted temperature, current wind speed and direction, and predicted wind speed and direction.

11. An apparatus of claim 10, wherein the vector function further includes at least a user preference parameter that accounts for ease of traversing the path by the user.

12. An apparatus of claim 11, wherein the apparatus is further caused to initiate presentation of a menu of options relating to degrees of difficulty of traversing the path.

13. An apparatus of claim 11, wherein another user preference parameter specifies either mode of transportation of the user along the path, garment or equipment available to the user, fitness level of the user, experience level in navigating, or a combination thereof.

14. An apparatus of claim 13, wherein the user is a part of a group of users, the apparatus is further caused to determine a group preference parameter to be computed by the vector function.

15. An apparatus of claim 10, wherein the vector function further includes a parameter relating to hazardous condition.

16. An apparatus of claim 10, wherein the vector function further includes a parameter specifying a penalty in terms of cost depending on distance away from the path.

17. An apparatus of claim 10, wherein the apparatus is further caused to retrieve an image including the starting point and the destination point, wherein each area corresponds to one or more pixels of the image.

18. An apparatus of claim 10,
wherein the parameters are used in a multi-cost mask to define the costs of each area along the path, the method further comprising:
calculating a distance transform of the multi-cost mask to provide estimated paths between the starting point and the destination point based on the cost; and
determining an optimized path using an Approximated Euclidean Distance Transform that uses a heuristic function h(x) as cost and that sets a penalty depending on distance from an approximated path.

19. A non-transitory computer-readable storage medium carrying one or more sequences of one or more instructions which, when executed by one or more processors, cause an apparatus to perform at least the following:
receiving a starting point and a destination point to assist a user in navigating; and
determining a path from the starting point to the destination point using a vector function that represents a cost of each area along the path, wherein the cost of each area along the path is based on direction from where the corresponding area is entered by the user,
wherein the vector function that represents a cost of each area along the path includes parameters for at least terrain, current temperature, predicted temperature, current wind speed and direction, and predicted wind speed and direction.

20. A non-transitory computer-readable storage medium of claim 19, wherein the vector function includes a group preference parameter that accounts for ease of traversing the path by a group of users including the user.

* * * * *